April 10, 1951        H. B. HUTTEN        2,548,309

ADJUSTABLE SECTIONAL SUN VISOR

Filed May 2, 1950

INVENTOR.
HENRY B. HUTTEN
BY
ATTORNEY

Patented Apr. 10, 1951

2,548,309

UNITED STATES PATENT OFFICE 2,548,309

ADJUSTABLE SECTIONAL SUN VISOR

Henry B. Hutten, Arlington Heights, Ill.

Application May 2, 1950, Serial No. 159,416

5 Claims. (Cl. 296—97)

This invention relates to an adjustable sectional sun visor, more particularly to a sun visor or glare shield for use on automobiles and other vehicles.

The principal object of the invention is to provide a sun visor or glare shield to be mounted in front of the driver, composed of a plurality of sections that are independently adjustable to permit of unlimited adjustment according to the needs of the driver for various conditions of driving during the day or night.

A further object of the invention is to provide a sectional sun visor the several sections of which may be easily and quickly adjusted in various positions as required.

A still further object of the invention is to provide an adjustable sectional sun visor that is simple and economical to manufacture and install.

Another object of the invention is to provide a three sectional sun visor in which the side edges of the center sections and the correlative edges of the outer sections are disposed at an angle corresponding approximately to the perspective of a straight stretch of road as viewed by the driver sitting on the front or driver's seat of an automobile.

The invention will appear more fully from the following description thereof, reference being had to the accompanying drawings, in which.

Figure 1:
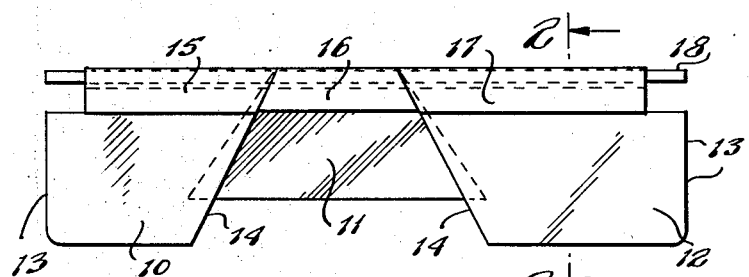
Fig. 1 is an elevation of a sun visor embodying the invention showing the sections in one adjusted position.
Figure 2:
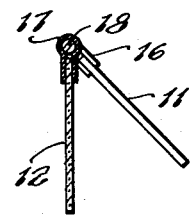
Fig. 2 is a sectional view taken on the line 2—2 of Fig. 1, looking in the directions of the arrows.

The visor, according to the preferred form illustrated, comprises three sections 10, 11, and 12 in side by side relation, each section being independently adjustable to various angular positions. The sections 10 and 12 each may have a perpendicular outer lateral edge 13, and each has an inclined inner lateral edge 14 which edges converge upwardly. The angle of convergence of said edges conforms approximately to the apparent angle of convergence of the sides of a straight road viewed in perspective, for the purpose hereinafter explained. The lateral edges of the middle section are inclined at the same angle as the edges 14 of the adjacent outer sections 10 and 12 so that when the sections are arranged in a common plane, as in Figs. 5 and 6, their surfaces will be flush with one another. The overall length of the three sections combined in the present form is about 20 inches, and the widths of the sections about four inches. The space between the lower ends of the inclined edges 14, that is the length of the lower end of section 11, is about nine inches. These dimensions are merely illustrative and subject to change.

The sections may be made of any material used, or adapted for use, in the manufacture of automobile sun visors or glare shields. They may, furthermore, be of any suitable color and degree of translucency.

Each section is held between the arms of the spring clips 15, 16, and 17, respectively, which clips are supported to swing or turn into various angular positions about a substantially horizontal axis or rod 18. The surface contact between the clips and rod is such that when the sections are swung into any adjusted positions they will be maintained by friction in those positions until changed manually.

Three arrangements of the sections are shown in the drawings but it is to be understood that they may be arranged in a number of different adjusted positions relative to one another to meet various driving conditions in day-time or at night.

The sun visor assembly is mounted behind the upper portion of the windshield (not shown) in position that when the middle section is in vertical position its center line will be substantially in line with the center of the steering wheel (not shown), and at a height to be approximately in the direct line of vision of the driver, at eye level, when looking straight ahead.

In Fig. 1 is shown a suggested arrangement of the sections for usual daylight driving conditions. In this arrangement the outer sections 10 and 12 are positioned vertically or so adjusted that their inclined edges 14 will apparently be substantially in collineation or coincidence with, or in parallelism to the sides of the road as viewed in perspective, while the middle section will be swung forward to an adjusted angular position so as to afford a clear view of the road ahead while at the same time protecting the driver's eyes from the glare of the sun. The sections 10 and 12 serve to eliminate or minimize any side glare, either original or reflected.

Figure 3:
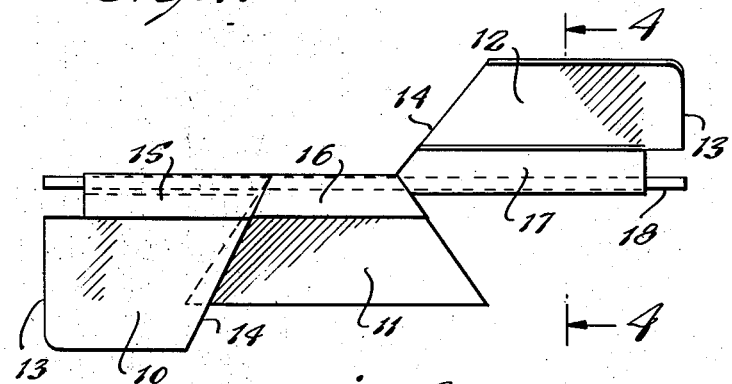
Fig. 3 is an elevational view with the sections in another adjusted position.
Figure 4:
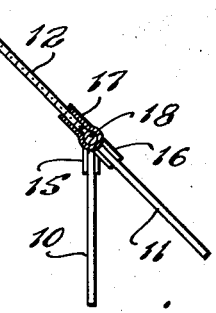
Fig. 4 is a sectional view taken on the line 4—4 of Fig. 3.

A suggested arrangement for normal night driving is illustrated in Fig. 3. In this case the section 10 is disposed vertically to protect against the glare of the headlights of approaching vehicles, the middle section 11 is swung forward to give a clear view ahead while still effecting some additional protection from the glare of the headlights, and section 12 is swung rearward so that the driver may have an unobstructed view of the right hand side of the road to see clearly any pedestrians walking along that side.

Figure 5:
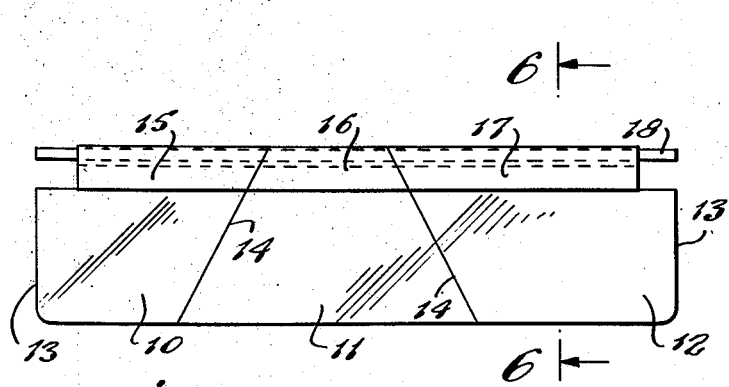
Fig. 5 is an elevational view showing the visor with the sections in closed or vertical position.
Figure 6:
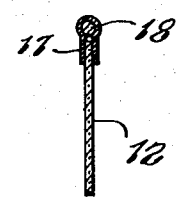
Fig. 6 is a sectional view taken on the line 6—6 of Fig. 5.

When traveling directly into the glare of strong sunlight, as in climbing a hill into the sun, all three sections may be swung into vertical or perpendicular positions, as shown in Fig. 5.

While it is preferred that the inclined edges 14 be straight, they may be somewhat curved or of other suitable shape. For instance, it is not necessary that the edges 14 be inclined throughout their entire length as they may terminate at the top or bottom, or at both ends, in relatively short vertical or perpendicular portions.

Various modifications may be made, within the scope of the invention, in the details of construction and arrangement of parts herein described and illustrated in the drawings.

What I claim is:

1. An adjustable sectional sun visor for attachment to an automobile or other vehicle, comprising three independently adjustable sections supported in side by side relation on an axis to be swung thereabout into various adjusted angular positions with respect to one another, the two outer sections each having an inclined inner lateral edge which edges converge upwardly, the angle of convergence of said edges conforming approximately to the apparent angle of convergence of the sides of a straight road in perspective.

2. An adjustable sectional visor for attachment to an automobile or other vehicle, comprising a middle and two outer independently adjustable sections supported in side by side relation on an axis to be swung thereabout into various adjusted angular positions with respect to one another, the two outer sections each having an inclined inner lateral edge which edges converge upwardly, the angle of convergence of said edges conforming approximately to the apparent angle of convergence of the sides of a straight road in perspective, the center line of the middle section, when said section is swung into substantially vertical position, being in the direct line of vision of the driver, at eye level, looking straight ahead.

3. An adjustable sectional visor for an automobile or other vehicle, comprising a plurality of independently adjustable sections supported in side by side relation on an axis to be swung thereabout into various adjusted angular positions with respect to one another, one of said sections being disposed so that when swung into approximately vertical position its center line will be substantially in the direct line of vision of the driver, at eye level, looking straight ahead, the lateral edges of said section and of the two adjacent sections being inclined and converging upwardly, the angle of convergence of said edges conforming approximately to the apparent angle of convergence of the sides of a straight road in perspective.

4. An adjustable sectional sun visor of the character described, comprising a middle section and two adjacent sections, said sections being supported in side by side relation on a rod for independent angular adjustment thereabout, the proximate lateral edges of the middle section and the two adjacent sections being inclined and converging upwardly.

5. An adjustable sectional sun visor of the character described, comprising a middle section and two contiguous sections, said sections being supported in side by side relation on a rod and being each independently adapted to be swung about said support into various adjusted angular positions relatively to one another, the surfaces of said sections being flush with one another when all three are swung into a common plane.

HENRY B. HUTTEN.

REFERENCES CITED

The following references are of record in the file of this patent:

UNITED STATES PATENTS

| Number | Name | Date |
|---|---|---|
| 1,591,739 | Blake | July 6, 1926 |
| 2,118,198 | Hathaway | May 24, 1938 |
| 2,220,429 | Soderberg | Nov. 5, 1940 |

FOREIGN PATENTS

| Number | Country | Date |
|---|---|---|
| 328,554 | Great Britain | Apr. 23, 1930 |